United States Patent
Yu

(10) Patent No.: US 11,182,588 B2
(45) Date of Patent: Nov. 23, 2021

(54) BIOMETRIC IDENTIFICATION APPARATUS, UNLOCKING METHOD OF BIOMETRIC IDENTIFICATION, AND TERMINAL DEVICE

(71) Applicant: HUIZHOU TCL MOBILE COMMUNICATION CO., LTD., Huizhou (CN)

(72) Inventor: Yang Yu, Huizhou (CN)

(73) Assignee: HUIZHOU TCL MOBILE COMMUNICATION CO., LTD., Huizhou (CN)

( * ) Notice: Subject to any disclaimer, the term of this patent is extended or adjusted under 35 U.S.C. 154(b) by 0 days.

(21) Appl. No.: 16/824,863

(22) Filed: Mar. 20, 2020

(65) Prior Publication Data

US 2020/0218881 A1    Jul. 9, 2020

Related U.S. Application Data

(63) Continuation of application No. PCT/CN2018/106502, filed on Sep. 19, 2018.

(30) Foreign Application Priority Data

Sep. 20, 2017    (CN) .......................... 201710850263.5

(51) Int. Cl.
*G06K 9/00* (2006.01)
*G06F 21/32* (2013.01)
*H04L 9/32* (2006.01)

(52) U.S. Cl.
CPC ......... *G06K 9/00087* (2013.01); *G06F 21/32* (2013.01); *G06K 9/0002* (2013.01);
(Continued)

(58) Field of Classification Search
CPC ............. G06K 9/00087; G06K 9/0002; G06K 9/0004; G06K 9/00892; G06K 2009/0006;
(Continued)

(56) References Cited

U.S. PATENT DOCUMENTS

| | | | |
|---|---|---|---|
| 2008/0092232 A1* | 4/2008 | Lu | G06F 21/32 726/20 |
| 2015/0282739 A1* | 10/2015 | Nishida | A61B 5/14532 600/316 |
| 2017/0124370 A1* | 5/2017 | He | G06K 9/0002 |

FOREIGN PATENT DOCUMENTS

| | | |
|---|---|---|
| CN | 201421614 Y | 3/2010 |
| CN | 202261588 U | 5/2012 |

(Continued)

OTHER PUBLICATIONS

International search report,PCT/CN2018/106502, dated Dec. 26, 2018 (2 pages).

(Continued)

*Primary Examiner* — Edward F Urban
*Assistant Examiner* — Wassim Mahrouka

(57) ABSTRACT

A biometric identification apparatus, an unlocking method of biometric identification, and a terminal device are provided. The biometric identification apparatus includes: a fingerprint receiving module, configured to sense approaching of a finger to generate a triggering instruction and collect a fingerprint pattern of a user based on the triggering instruction; and a pulse receiving module, coupled with the fingerprint receiving module and configured to receive the triggering instruction and collect pulse information of the user based on the triggering instruction.

19 Claims, 5 Drawing Sheets

(52) U.S. Cl.
CPC .......... *G06K 9/0004* (2013.01); *H04L 9/3231* (2013.01); *G06K 2009/0006* (2013.01); *G06K 2009/00932* (2013.01)

(58) Field of Classification Search
CPC .......... G06K 2009/00932; G06F 21/32; H04L 9/3231; H04M 1/72463; H04M 1/67
See application file for complete search history.

(56) References Cited

FOREIGN PATENT DOCUMENTS

| | | | |
|---|---|---|---|
| CN | 105631442 | A | 6/2016 |
| CN | 106778508 | A | 5/2017 |
| CN | 106802710 | A | 6/2017 |
| CN | 107066853 | A | 8/2017 |
| CN | 206460478 | U | 9/2017 |
| CN | 107864264 | A | 3/2018 |
| WO | WO2017022990 | A1 | 2/2017 |
| WO | WO2017070711 | A1 | 4/2017 |

OTHER PUBLICATIONS

First Office Action from China patent office in a counterpart Chinese patent Application 201710850263.5, dated Sep. 4, 2019 (23 pages).

\* cited by examiner

BIOMETRIC IDENTIFICATION APPARATUS, UNLOCKING METHOD OF BIOMETRIC IDENTIFICATION, AND TERMINAL DEVICE

CROSS-REFERENCE TO RELATED APPLICATIONS

The present application is a continuation-application of International (PCT) Patent Application No. PCT/CN2018/106502, filed on Sep. 19, 2018, which claims foreign priority of Chinese Patent Application No. 201710850263.5, filed on Sep. 20, 2017 in the National Intellectual Property Administration of China, the entire contents of which are hereby incorporated reference in their entireties.

TECHNICAL FIELD

The present disclosure relates to the field of information security, and in particular to a biometric identification apparatus, an unlocking method of biometric identification, and a terminal device.

BACKGROUND

As technologies develop continuously, electronic devices have been indispensable for people's daily lives, and usage of the electronic devices by many users may involve information related to security and privacy. To improve the security of using electronic devices, encryption has been applied to a large amount of electronic devices. For example, a correct gesture passcode needs to be inputted, or the electronic device must be activated by identifying a fingerprint.

However, if the passcode is known by another person, the another person may get the electronic device and use the known passcode to activate the electronic device. There may be a risk of disclosing secure and private information of the owner.

In addition, as the fingerprint identification of mobile phones has been widely applied, an increasing number of decryption schemes specifically for the fingerprint identification have been available in the market. Besides software for avoiding the fingerprint encryption, other decryption schemes, which can be easily performed, may include using a physical silica membrane having the fingerprint or using electronic fingerprint to repeatedly attack the encryption, generating a huge risk for rights of the owner.

SUMMARY OF THE DISCLOSURE

According to a first aspect of the present disclosure, a biometric identification apparatus is provided and includes: a fingerprint receiving module and a pulse receiving module. The fingerprint receiving module includes a fingerprint capacitor chip and is configured to perform operations of: sensing approaching of a finger of a user, wherein capacitance of at least a partial region of the fingerprint capacitor chip varies in response to the approaching of the finger, and variation in the capacitance serves as a triggering instruction; receiving the variation in the capacitance of various regions of the fingerprint capacitor chip based on the triggering instruction; calculating a fingerprint pattern of the user based on the variation in the capacitance of various regions of the fingerprint capacitor chip. The pulse receiving module includes an infrared light emitting diode and an optical identification module. The infrared light emitting diode is configured to emit a first light wave to the finger of the user based on the triggering instruction, and the first light wave includes a first set of light waves in various frequencies. The optical identification module is configured to receive a second light wave, calculate pulse information of the user based on the second light wave, and receive a third light wave. The second light wave is generated by the finger reflecting the first light wave and includes a second set of light waves in the various frequencies corresponding to the first set of light waves, the third light wave is spontaneously generated by the finger and includes a third set of light waves, and a frequency of each light wave of the third set of light waves is different from the various frequencies of the first set of light waves.

According to a second aspect of the present disclosure, an unlocking method of biometric identification is provided and includes: sensing approaching of a finger of a user, generating a triggering instruction in response to the sensed approaching; collecting a fingerprint pattern and pulse information of the user in response to the triggering instruction; identifying the fingerprint pattern and the pulse information of the user, determining whether the user being an authorized user; and unlocking a biometric identification apparatus in response to the user being determined to be both a first authorized user by using the pulse information and a second authorized user by using the fingerprint pattern.

According to a third aspect of the present disclosure, a terminal device is provided and includes: a body and a biometric identification apparatus. At least one face of the biometric identification apparatus is arranged on a surface of the body, and the biometric identification apparatus includes a fingerprint receiving module and a pulse receiving module. The fingerprint receiving module is configured to sense approaching of a finger of a user, generate a triggering instruction in response to the sensed approaching, and collect a fingerprint pattern of the user based on the triggering instruction; and the pulse receiving module may be coupled with the fingerprint receiving module and may be configured to receive the triggering instruction and collect pulse information of the user based on the triggering instruction.

BRIEF DESCRIPTION OF THE DRAWINGS

To further illustrate technical solutions of embodiments of the present disclosure more clearly, drawings for the embodiments will be briefly described hereinafter. Obviously, the drawings described in the following are some embodiments of the present disclosure. To any one of skill in the art can obtain other drawings based on the following drawings without any creative work.

FIG. 8b is a flow chart of performing collection of a fingerprint pattern as described in an operation of S802 shown in FIG. 8a.

FIG. 8c a flow chart of performing collection of pulse information as described in the operation of S802 shown in FIG. 8a.

DETAILED DESCRIPTION

Figure 1:
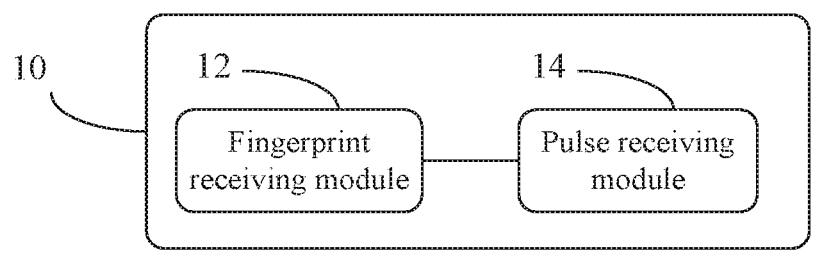
FIG. 1 is a structural diagram of a biometric identification apparatus according to an embodiment of the present disclosure.

Technical solutions of the embodiments of the present disclosure may be illustrated clearly and comprehensively by referring to the drawings of the embodiments. Obviously, the embodiments to be illustrated are only a part of, but not all of, the embodiments. Based on the embodiments of the present disclosure, other embodiments obtained by any one of skill in the art without creative work should be within the scope of the present disclosure.

As shown in FIG. 1, a structural diagram of a biometric identification apparatus is provided. The biometric identification apparatus 10 may include: a fingerprint receiving module 12 and a pulse receiving module 14 coupled with the fingerprint receiving module 12. The fingerprint receiving module 12 may be configured to sense approaching of a finger of a user, generate a triggering instruction in response to the sensed approaching, and collect a fingerprint pattern of the user based on the triggering instruction. The pulse receiving module 14 may be configured to receive the triggering instruction and collect pulse information of the user based on the triggering instruction.

It may be understood that, sensing approaching of a finger of a user may refer to sensing the finger of the user approaching the biometric identification apparatus 10 or sensing a distance between the finger of the user and the biometric identification apparatus 10 being less than a certain value.

In the present embodiment, the fingerprint receiving module may sense approaching of the finger of the user and generate the triggering instruction in response to the sensed approaching. The fingerprint receiving module 12 may collect the fingerprint pattern of the user based on the triggering instruction. The pulse receiving module 14 may receive the triggering instruction and collect pulse information of the user. In such a way, a technological base may be provided for double encryption by combining the fingerprint identification and the pulse identification.

Figure 2:
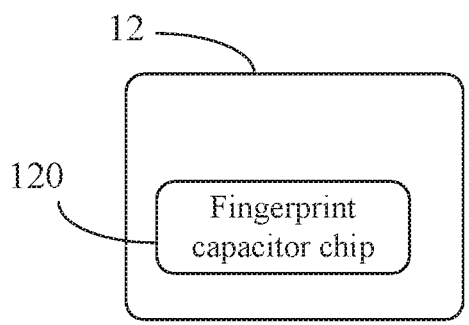
FIG. 2 is a structural diagram of a fingerprint receiving module shown in FIG. 1.

As shown in FIG. 2, the fingerprint receiving module 12 may include a fingerprint capacitor chip 120. After sensing approaching of the finger of the user, capacitance of at least a partial region of the fingerprint capacitor chip 120 may be varied, and variation in capacitance may serve as the triggering instruction. The fingerprint receiving module 12 may be configured to receive the variation in capacitance of various regions of the fingerprint capacitor chip 120 based on the triggering instruction and calculate the fingerprint pattern of the user based on the variation in capacitance of various regions of the fingerprint capacitor chip 120.

Figure 3:
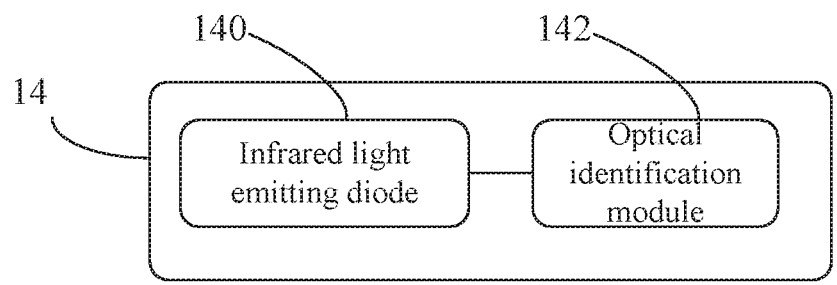
FIG. 3 is a structural diagram of a pulse receiving module shown in FIG. 1.

As shown in FIG. 3, the pulse receiving module 14 may include an infrared light emitting diode 140 and an optical identification module 142. The infrared light emitting diode 140 may be configured to emit a first light wave to the finger of the user based on the triggering instruction, and the first light wave may include a first set of light waves in various frequencies. The optical identification module 142 may be configured to receive a second light wave generated by the finger reflecting the first light wave, calculate pulse information of the user based on the second light wave, and/or receive a third light wave generated spontaneously by the finger of the user, and calculate a temperature of the finger based on the third light wave. The second light wave may include a second set of light waves corresponding to the first set of light waves. The third light wave may include a third set of light waves, and a frequency of each light wave of the third set of light waves may be different from the various frequencies of the first set of light waves.

For example, when the finger of the user is approaching the biometric identification apparatus 10, the capacitance of at least a partial region of the fingerprint capacitor chip 120 is varied, and the variance in capacitance may trigger the fingerprint receiving module 12 and the pulse receiving module 14 to work. The fingerprint receiving module 12 may calculate the fingerprint pattern based on the variance in capacitance of various regions of the fingerprint capacitor chip 120. When the variance in capacitance triggers the pulse receiving module 14 to work, the infrared light emitting diode 140 may emit the first light wave to the finger of the user, and the first light wave may be a first set of light waves, including a light wave in frequency F1 and a light wave in frequency F2. When the first set of first light waves are reflected by the finger after reaching the finger of the user, the optical identification module 142 may receive the second light wave reflected by the finger and calculate the pulse information of the user based on the second light wave. As an implementation, as the finger of the user may spontaneously generate the third light wave, and the third light wave may be in frequency F3, the optical identification module 142 may receive the third light wave and calculate the temperature of the finger based on the third light wave. It may be understood that, the frequency of any light wave of the first set of light waves may be different from a frequency of the third light wave, such that interference may be avoided. In another implementation, the third light wave spontaneously generated by the finger may include a light wave in frequency F3 and a light wave in frequency F4. The optical identification module 142 may receive the third light wave (i.e., the light wave in frequency F3 and the light wave in frequency F4) and calculate the temperature of the finger based on the third light wave. The frequency F3 may be difference from F1 and F2, and the frequency F4 may be different from F1 and F2. That is, the frequency of each light wave of the third light wave may be different from the frequency of any light wave of the first set of light waves.

In the present embodiment, the pulse receiving module 14 may calculate the pulse information and the temperature of the finger of the user, providing the technological base for double encryption by combining the fingerprint identification and the pulse identification, improving an encryption level and security.

As an implementation, the optical identification module 142 may be configured to compare an amount of each light wave in each frequency of the second set of light waves to an amount of that of the first set of light waves correspondingly, such that a fixed amount of light wave absorbed by a vein of the finger may be calculated. For example, an amount of the light wave in F1 and an amount of the light wave in F2 of the first set of light waves may both be 100%, as the vein of the finger may absorb a part of the amount of the light waves, the amount of the light wave in F1 in the second set of light waves may be 80%, and the amount of the light wave in F2 in the second set of light waves may be 50%, such that the fixed amount of light wave absorbed by the finger of the user may be calculated.

Figure 4:
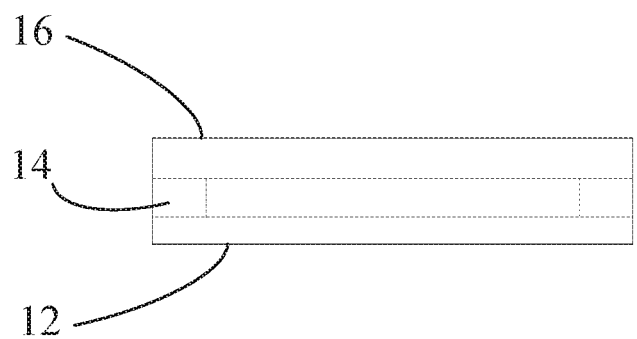
FIG. 4 is a structural diagram of a biometric identification apparatus according to another embodiment of the present disclosure.
Figure 5:
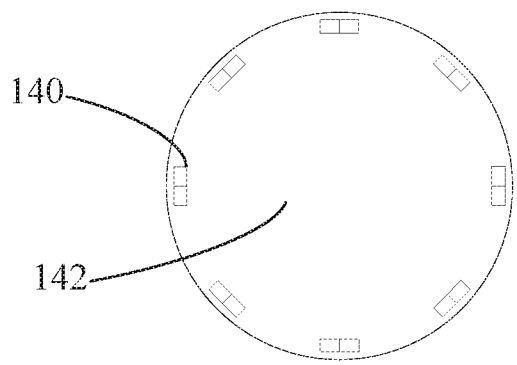
FIG. 5 is a plane schematic view of the pulse receiving module shown in FIG. 4.

FIG. 4 provides a structural diagram of a biometric identification apparatus is provided in FIG. 4, and FIG. 5 provides is a plane schematic view of the pulse receiving module shown in FIG. 4. As an implementation, the biometric identification apparatus 10 may include a cover 16, arranged to cover the fingerprint receiving module 12 and the pulse receiving module 14 to insulate the finger of the user from the fingerprint receiving module 12 and the pulse receiving module 14. The cover 16 may be a transparent cover, and the pulse receiving module 14 may be arranged between the cover 16 and the fingerprint receiving module 12.

As an implementation, the pulse receiving module 14 may include the optical identification module 142 covered by the cover 16 and infrared light emitting diodes 140 dispersively distributed on the optical identification module 142. It may be understood that, the number of the infrared light emitting diodes 140 may not be limited. The infrared light emitting diodes 140 may be arranged on the optical identification module 142 to form a ring shape as shown in FIG. 5 or arranged to form an array or other patterns.

In the present embodiment, the cover 16 may be configured to avoid the fingerprint receiving module 12 and the pulse receiving module 14 from contacting an outside directly while the finger is approaching the biometric identification apparatus 10 and the fingerprint receiving module 12 is generating the triggering instruction, improving service time of the biometric identification apparatus 10.

Figure 6:
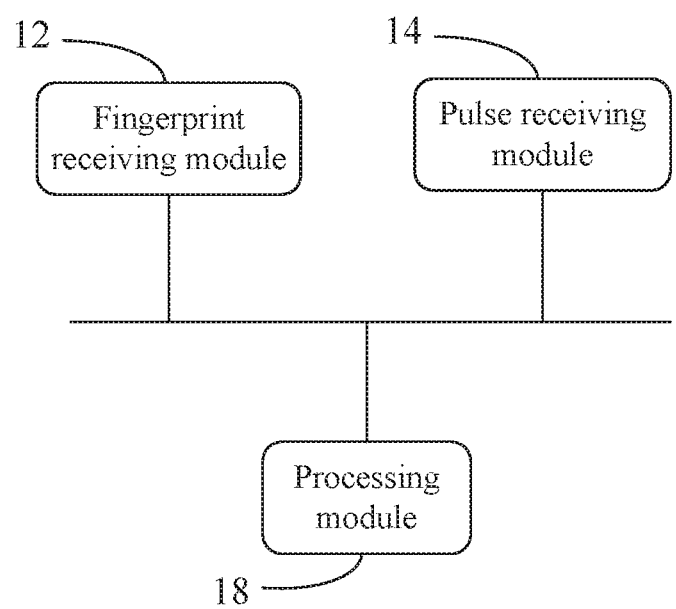
FIG. 6 is a structural diagram of a biometric identification apparatus according to still another embodiment of the present disclosure.

As shown in FIG. 6, a structural diagram of a biometric identification apparatus is provided. In the present embodiment, the biometric identification apparatus may further include a processing module 18, coupled with the fingerprint receiving module 12 and the pulse receiving module 14.

As an implementation, the processing module 18 may be configured to compare the fingerprint pattern of the user collected by the fingerprint receiving module 12 to a predefined fingerprint pattern. In response to the collected fingerprint pattern of the user matching with the predefined fingerprint pattern, the user may be determined to be a first authorized user. The processing module 18 may be configured to compare the pulse information and/or the temperature of the finger collected by the pulse receiving module 14 to predefined pulse information and/or a predefined temperature. In response to a comparison result being within a predefined range, the user may be determined to be a second authorized user. In response to the user being determined to be both the first authorized user and the second authorized user, the biometric identification apparatus may be unlocked.

It may be understood that, the predefined fingerprint pattern may be a fingerprint pattern of the authorized user, and the predefined pulse information and/or the predefined temperature may be set to be within a certain range, i.e., the predefined range. The predefined range may be determined by considering various factors, such as weather, a physical condition of the user, and the like. Further, the predefined range should be a maximum range which the physical conditions of human can reach.

In one application scenario, a user A may copy a fingerprint of a user B and make a corresponding fingerprint membrane C. The user A may use the fingerprint membrane C to contact the biometric identification apparatus for unlocking. When the fingerprint receiving module 12 collects a fingerprint pattern of the fingerprint membrane C, the processing module 18 may compare the fingerprint pattern of the fingerprint membrane C to the predefined fingerprint pattern, and the predefined fingerprint pattern may be a fingerprint pattern of the user B. The fingerprint pattern of the fingerprint membrane C may be determined to match with the predefined fingerprint pattern, and the fingerprint membrane C may be determined to be the first authorized user. After the pulse receiving module 14 collects the pulse information and/or the temperature of the fingerprint membrane C, the pulse receiving module 14 may compare the pulse information to the predefined pulse information, and/or compare the temperature of the fingerprint membrane C to the predefined temperature. The predefined pulse information and/or the predefined temperature may be a maximum range that a human body can reach. In response to the pulse information and/or temperature of the fingerprint membrane C being out of the predefined range, the fingerprint membrane C may be determined not to be the second authorized user. The processing module 18 may determine the fingerprint membrane C is not both the first authorized user and the second authorized user, the user A may not be able to unlock the biometric identification apparatus by copying the fingerprint of the user B and making the corresponding fingerprint membrane C. When the user B needs to unlock the biometric identification apparatus, the processing module 18 may compare the fingerprint pattern of the user B collected by the fingerprint receiving module 12 to the predefined fingerprint pattern to determine the user B being the first authorized user. The processing module 18 may further compare the pulse information of the finger of the user B collected by the pulse receiving module 14 to the predefined pulse information, and/or compare the temperature of the user B to the predefined temperature. Regardless of the environment in which the user B is settled and regardless of the physical condition of the user B, the pulse information and/or the temperature of the finger of the user B may be within the predefined range at all times, such that the user B may be determined to be the second authorized user. After determining the user B being both the first authorized user and the second authorized user, the biometric identification apparatus may be unlocked. Unlocking may be performed in response to the fingerprint pattern meeting the predefined pattern, the amount of light wave absorbed by the vein meeting the predefined amount, and/or the temperature of the finger meeting the predefined temperature. The unlocking may not be performed in response to any one of the fingerprint identification, the amount of light wave absorbed by the vein, and the temperature of the finger failing to meet predefined criteria. In such a way, the security of the biometric identification apparatus may be significantly improved.

In other implementations, the fingerprint receiving module 12 may further be configured to compare the collected fingerprint pattern of the user to the predefined fingerprint pattern and determine the user to be the first authorized user in response to the fingerprint pattern of the user matching with the predefined fingerprint pattern. The pulse receiving module 14 may further be configured to compare the collected pulse information and/or the temperature of the finger of the user to the predefined pulse information and/or the predefined temperature respectively, and determine the user to be the second authorized user in response to a comparison result being with a predefined range. The processing module 18 may be configured to unlock the biometric identification apparatus in response to the user being determined to be both the first authorized user and the second authorized user. The present implementation may be different from the above-mentioned implementation, as the processing module 18 may be configured to determine whether the user is both the first authorized user and the second authorized user, whereas comparing the fingerprint pattern collected by the fingerprint receiving module 12 to the predefined fingerprint pattern and comparing the pulse information and/or the temperature collected by the pulse receiving module 14 to the predefined pulse information and/or the predefined temperature may be performed by the fingerprint receiving module 12 and the pulse receiving module 14, respectively.

Figure 7:
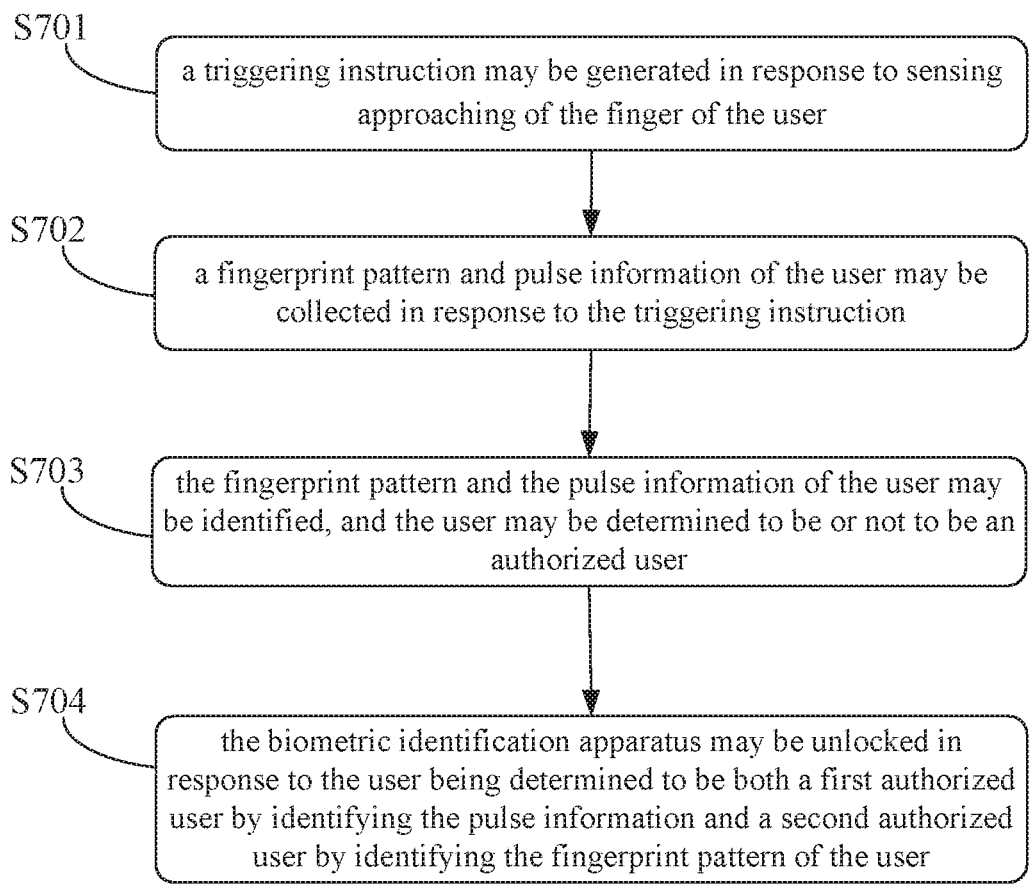
FIG. 7 is a flow chart of an unlocking method of biometric identification according to an embodiment of the present disclosure.

As shown in FIG. 7, a flow chart of an unlocking method of biometric identification is provided. The method in the present embodiment may include following operations.

In an operation of S701, a triggering instruction may be generated in response to sensing approaching of the finger of the user.

In an operation of S702, a fingerprint pattern and pulse information of the user may be collected in response to the triggering instruction.

In an operation of S703, the fingerprint pattern and the pulse information of the user may be identified, and the user may be determined to be or not to be an authorized user.

In operation of S704, the biometric identification apparatus may be unlocked in response to the user being determined to be both a first authorized user by identifying the pulse information and a second authorized user by identifying the fingerprint pattern of the user.

According to the present embodiment, the triggering instruction may be generated in response to sensing approaching of the finger of the user, the fingerprint receiving module may collect the fingerprint pattern of the user based on the triggering instruction, and the pulse receiving module may collect the pulse information of the user after receiving the triggering instruction, providing the technological base for double encryption of combining the fingerprint identification and the pulse identification.

Figure 8A:
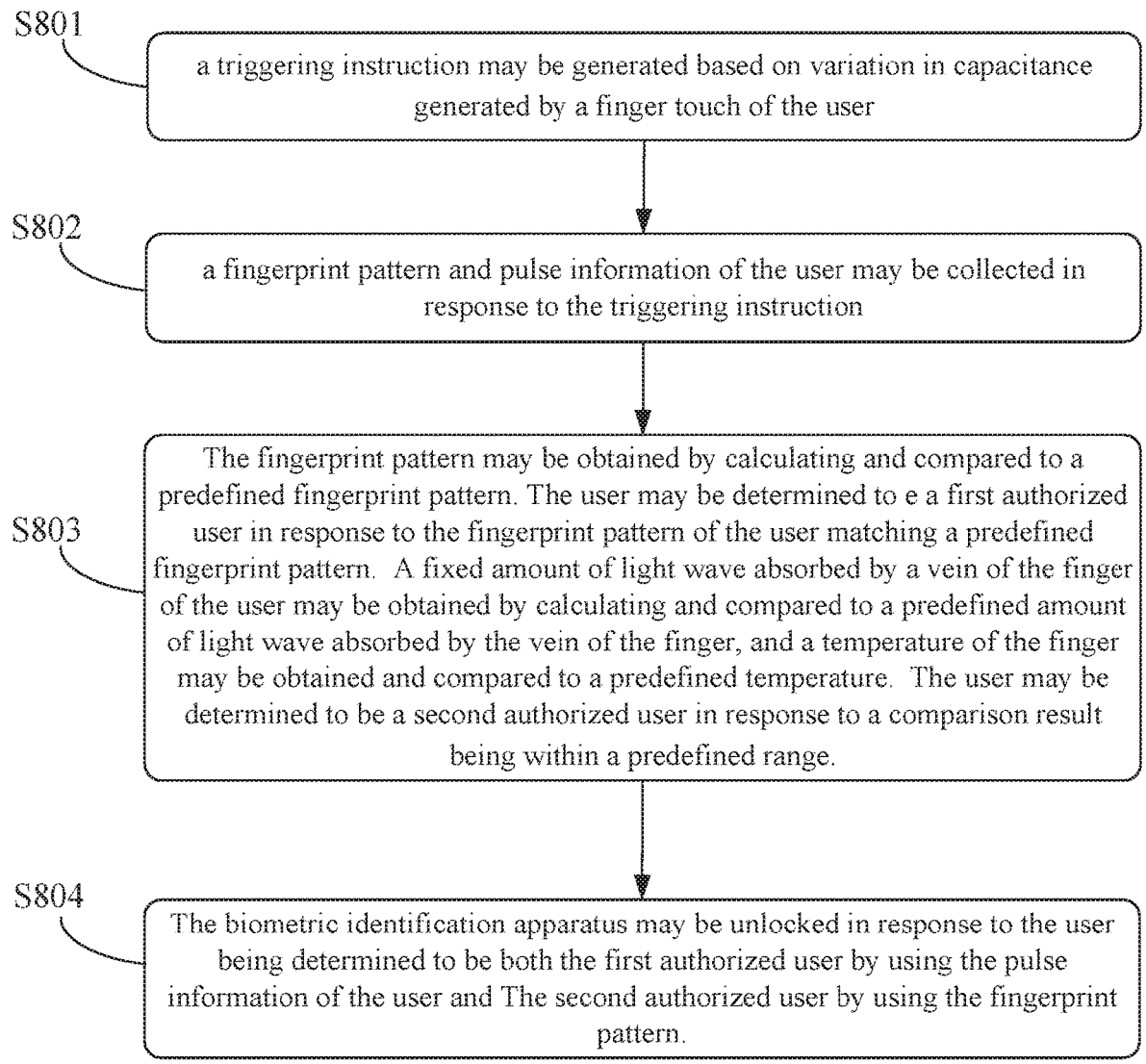
FIG. 8a is a flow chart of an unlocking method of biometric identification according to another embodiment of the present disclosure.

As shown in FIG. 8, a flow chart of an unlocking method of biometric identification is provided. As show in FIG. 8a, the method in the present application may include following operations.

In an operation of S801, a triggering instruction may be generated based on variation in capacitance generated by a finger touch of the user.

In an operation of S802, a fingerprint pattern and pulse information of the user may be collected in response to the triggering instruction.

In an operation of S803, the fingerprint pattern may be obtained by calculating and compared to a predefined fingerprint pattern. The user may be determined to be a first authorized user in response to the fingerprint pattern of the user matching a predefined fingerprint pattern. A fixed amount of light wave absorbed by a vein of the finger of the user may be obtained by calculating and compared to a predefined amount of light wave absorbed by the vein of the finger, and/or a temperature of the finger may be obtained and compared to a predefined temperature. The user may be determined to be a second authorized user in response to a comparison result of the amount of light wave absorbed by the vein and a comparison result of the temperature of the finger being within a predefined range.

In an operation of S804, the biometric identification apparatus may be unlocked in response to the user being determined to be the first authorized user by using the pulse information of the user and/or the user being determined to be the second authorized user by using the fingerprint pattern.

Figure 8B:
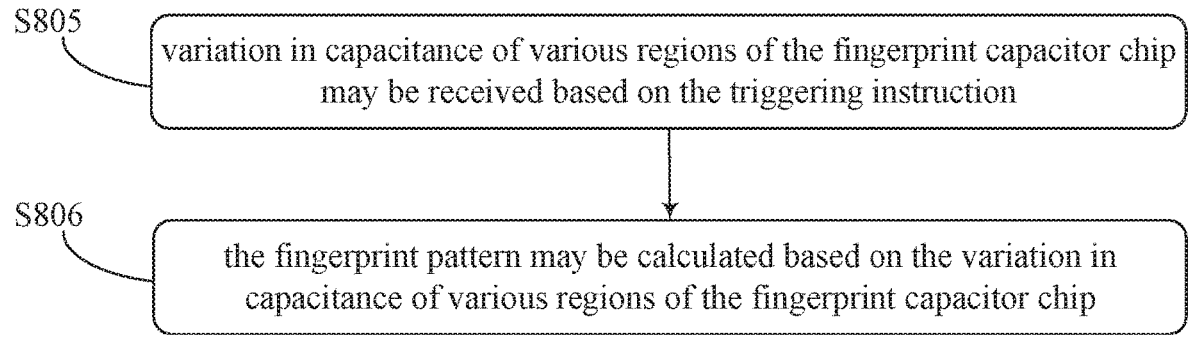

As shown in FIG. 8b, the operation of collecting the fingerprint pattern of the user as described in S802 may include following operations.

In an operation of S805, variation in capacitance of various regions of the fingerprint capacitor chip may be received based on the triggering instruction.

In an operation of S806, the fingerprint pattern may be calculated based on the variation in capacitance of various regions of the fingerprint capacitor chip.

Figure 8C:
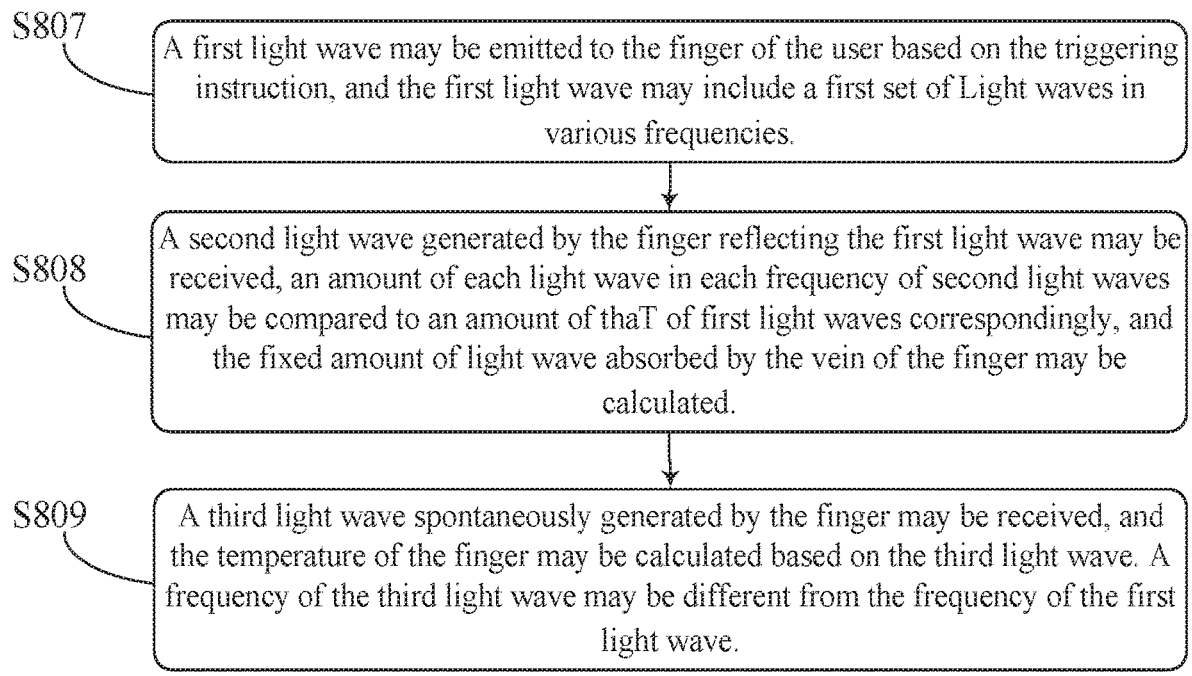

As shown in FIG. 8c, the operation of collecting the pulse information of the user as described in S802 may include following operations.

In an operation of S807, a first light wave may be emitted to the finger of the user based on the triggering instruction, and the first light wave may include a first set of light waves in various frequencies.

In an operation of S808, a second light wave generated by the finger reflecting the first light wave may be received, the second light wave may include a second set of light waves corresponding to the first set of light waves, and an amount of each light wave in each frequency of the second set of light waves may be compared to an amount of that of the first set of light waves correspondingly, and the fixed amount of light wave absorbed by the vein of the finger may be calculated.

As an implementation, an operation of S809 may be included. In the operation of S809, a third light wave spontaneously generated by the finger may be received, and the temperature of the finger may be calculated based on the third light wave. The third light wave may include a third set of light waves, and a frequency of each light wave of the third set of light waves may be different from the various frequencies of the first set of light waves.

According to the present embodiment, the fingerprint pattern and the pulse information of the user may be identified, providing technological support for double encryption by combining the fingerprint identification and the pulse identification, improving security of the biometric identification apparatus. The temperature of the finger of the user may further be identified to improve an encryption level, improving the security.

Detailed performance of the unlocking method of the biometric identification may refer to the description of the embodiments about the biometric identification apparatus.

Figure 9:
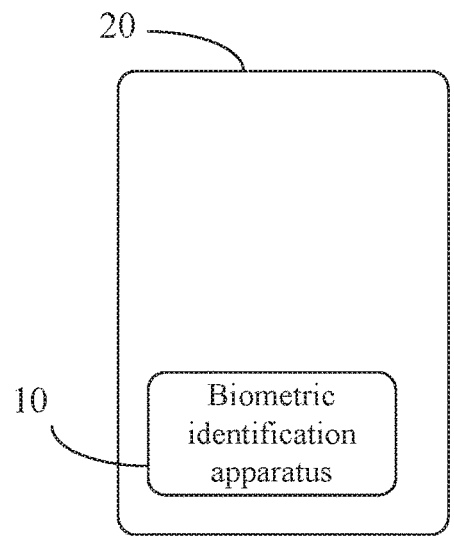
FIG. 9 is a structural diagram of a terminal device according to an embodiment of the present disclosure.

As shown in FIG. 9, a structural diagram of a terminal device is provided. In the present embodiment, the terminal device may include a body 20 and the biometric identification apparatus 10 according to any one of the above-mentioned embodiments, and the biometric identification apparatus 10 may be configured to perform any one of the above-mentioned unlocking methods.

The biometric identification apparatus 10 may be configured to sense approaching of the finger of the user to generate the triggering instruction; collecting fingerprint pattern and the pulse information of the user in response to the triggering instruction; identifying the fingerprint pattern and the pulse information of the user to determine whether the user being the authorized user; unlocking the biometric identification apparatus in response to the user being determined to be the first authorized user through the pulse information and/or in response to the user being determined to be the second authorized user through the fingerprint pattern. It may be understood that, after the biometric identification apparatus 10 is unlocked, the user may have permission of using the terminal device.

It may be understood that, at least one face of the biometric identification apparatus 10 is arranged on a surface of the body 20 of the terminal device, enabling the biometric identification 10 to sense approaching of the finger of the user.

In the present embodiment, the body 20 of the terminal device may be arranged with the biometric identification apparatus 10 to make the terminal device to use the double encryption combining the fingerprint identification and the pulse identification, improving security of the terminal device and improving the encryption level.

Detailed information of the terminal device may refer to the description of the embodiments about the biometric identification apparatus and the unlocking method of biometric identification.

According to the biometric identification apparatus, the unlocking method of biometric identification, and the terminal device provided by the present disclosure, the fingerprint receiving module may generate the triggering instruction in response to sensing approaching of the finger of the user, the fingerprint receiving module may collect the fingerprint pattern of the user based on the triggering instruction, and the pulse receiving module may collect the pulse information of the user after receiving the triggering instruction, such that the technological base may be provided for double encryption by combining the fingerprint identification and the pulse identification.

In the implementations of the present disclosure, it may be understood that, the biometric identification apparatus, the unlocking method of biometric identification, and the terminal device may be achieved by other means. For example, the above-mentioned implementations of the biometric identification apparatus, the unlocking method of biometric identification, and the terminal device may be exemplary only. The structural division may be a logical functional division, and divisions by other means may be performed. Each structure may be arranged physically and independently, alternatively, two or more of the structures may be integrated into one structure.

The above description includes implementations of the present disclosure only, but does not limit the scope of the present disclosure. Any equivalent structural or principal modification performed based on the description and the drawings of the present disclosure, applied directly or indirectly in other related art, should be within the scope of the present disclosure.

What is claimed is:

1. A biometric identification apparatus, comprising:
   a fingerprint receiving module, comprising a fingerprint capacitor chip and being configured to perform operations of:
      sensing approaching of a finger of a user, wherein capacitance of at least a partial region of the fingerprint capacitor chip varies in response to the approaching of the finger, and variation in the capacitance serves as a triggering instruction;
      receiving the variation in the capacitance of various regions of the fingerprint capacitor chip based on the triggering instruction;
      calculating a fingerprint pattern of the user based on the variation in the capacitance of various regions of the fingerprint capacitor chip; and
   a pulse receiving module, comprising an infrared light emitting diode and an optical identification module, wherein
      the infrared light emitting diode is configured to emit a first light wave to the finger of the user based on the triggering instruction, and the first light wave comprises a first set of light waves in various frequencies; and
      the optical identification module is configured to receive a second light wave, calculate pulse information of the user based on the second light wave, receive a third light wave and calculate a temperature of the finger, wherein the second light wave is generated by the finger reflecting the first light wave, the second light wave comprises a second set of light waves corresponding to the first set of light waves, the third light wave is spontaneously generated by the finger and comprises a third set of light waves, and a frequency of each light wave of the third set of light waves is different from the various frequencies of the first set of light waves.

2. The biometric identification apparatus according to claim 1, wherein calculating the pulse information of the user based on the second light wave by the optical identification module comprise:
   comparing an amount of each light wave in each frequency of the second set of light waves to an amount of that of the first set of light waves correspondingly, and calculating a fixed amount of light wave absorbed by a vein of the finger of the user.

3. The biometric identification apparatus according to claim 1, further comprising:
   a cover, arranged to cover the fingerprint receiving module and the pulse receiving module to insulate the fingerprint receiving module and the pulse receiving module from the finger of the user, wherein the cover is a transparent cover, and the pulse receiving module is arranged between the cover and the fingerprint receiving module.

4. The biometric identification apparatus according to claim 3, wherein
   the optical identification module is arranged to be covered by the cover, and a plurality of infrared light emitting diodes are dispersively arranged on the optical identification module.

5. The biometric identification apparatus according to claim 4, wherein
   the plurality of infrared light emitting diodes are arranged on the optical identification module to form a ring shape.

6. The biometric identification apparatus according to claim 1, further comprising a processing module, coupled with the fingerprint receiving module and the pulse receiving module respectively, wherein
   the processing module is configured to compare the fingerprint pattern collected by the fingerprint receiving module to a predefined fingerprint pattern; determine the user to be a first authorized user in response to the fingerprint pattern of the user matching with the predefined fingerprint pattern; compare the pulse information collected by the pulse receiving module to predefined pulse information; compare the temperature of the finger collected by the pulse receiving module to a predefined temperature; determine the user to be a second authorized user in response to a comparison result of the pulse information and the temperature of the finger being within a predefined range; unlock the biometric identification apparatus in response to the user being determined to be both the first authorized user and the second authorized user.

7. The biometric identification apparatus according to claim 1, further comprising a processing module, coupled with the fingerprint receiving module and the pulse receiving module respectively, wherein the fingerprint receiving module is further configured to compare the collected fingerprint pattern of the user to the predefined fingerprint pattern, and determine the user to be the first authorized user in response to the fingerprint pattern of the user matching with the predefined fingerprint pattern;

the pulse receiving module is further configured to compare the collected pulse information of the user to predefined pulse information, compare the collected temperature of the finger to a predefined temperature, and determine the user to be the second authorized user in response to the comparison result of the pulse information and the temperature of the finger being within a predefined range; and the processing module is configured to unlock the biometric identification apparatus in response to the user being determined to be both the first authorized user and the second authorized user.

8. An unlocking method of biometric identification performed by a biometric identification apparatus, comprising:

sensing approaching of a finger of a user, generating a triggering instruction in response to the sensed approaching;

collecting a fingerprint pattern and pulse information of the user in response to the triggering instruction;

identifying the fingerprint pattern and the pulse information of the user, determining whether the user being an authorized user; and unlocking the biometric identification apparatus in response to the user being determined to be both a first authorized user by using the fingerprint pattern and a second authorized user by using the pulse information, wherein the method further comprises: receiving a finger light wave generated spontaneously by the finger of the user, and calculating a temperature of the finger based on the finger light wave; and comparing the temperature of the finger to a predefined temperature for verification.

9. The unlocking method according to claim 8, wherein the sensing approaching of the finger of the user and generating the triggering instruction in response to the sensed approaching comprises: generating variation in capacitance based on a finger touch, generating the triggering instruction based on the variation in capacitance;

the collecting the fingerprint pattern comprises:

receiving the variation in capacitance of various regions of a fingerprint capacitor chip based on the triggering instruction; and calculating the fingerprint pattern of the user based on the variation in capacitance of various regions of the fingerprint capacitor chip;

the collecting pulse information of the user comprises:

emitting a first light wave to the finger of the user based on the triggering instruction, wherein the first light wave comprises a first set of light waves in various frequencies;

receiving a second light wave, wherein the second light wave is generated by the finger reflecting the first light wave and comprises a second set of light waves corresponding to the first set of light waves; comparing an amount of each light wave in each frequency of the second set of light waves to an amount of that of the first set of light waves correspondingly; and calculating a fixed amount of light wave absorbed by a vein of the finger of the user; and wherein the finger light wave comprises a third set of light waves, and a frequency of each light wave of the third set of light waves is different from the various frequencies of the first set of light waves.

10. The unlocking method according to claim 8, wherein the identifying the fingerprint pattern and the pulse information of the user and determining whether the user being the authorized user comprises:

comparing the fingerprint pattern obtained by calculation to a predefined fingerprint pattern, determining the user to be the first authorized user in response to the fingerprint pattern of the user matching with the predefined fingerprint pattern; and comparing an amount of light wave absorbed by a vein of the finger to a predefined amount and comparing a temperature of the finger to a predefined temperature, determining the user to be a second authorized user in response to a comparison result of the amount of light wave absorbed by the vein and the temperature of the finger being within a predefined range.

11. A terminal device, comprising a body and a biometric identification apparatus, at least one face of the biometric identification apparatus being arranged on a surface of the body, and the biometric identification apparatus comprising a fingerprint receiving module and a pulse receiving module, wherein the fingerprint receiving module is configured to sense approaching of a finger of a user, generate a triggering instruction in response to the sensed approaching, and collect a fingerprint pattern of the user based on the triggering instruction; and the pulse receiving module is coupled with the fingerprint receiving module, and is configured to receive the triggering instruction and collect pulse information of the user based on the triggering instruction, wherein the pulse receiving module comprises an infrared light emitting diode and an optical identification module;

the infrared light emitting diode is configured to emit a first light wave to the finger of the user based on the triggering instruction, wherein the first light wave comprise a first set of light waves in various frequencies;

the optical identification module is configured to receive a second light wave, calculate the pulse information of the user based on the second light wave, and receive a third light wave, and calculate a temperature of the finger based on the third light wave, wherein the second light wave is generated by the finger reflecting the first light wave, the second light wave comprises a second set of light waves corresponding to the first set of light waves, the third light wave is spontaneously generated by the finger and comprises a third set of light waves, and a frequency of each light wave of the third set of light waves is different from a the various frequencies of the first set of light waves.

12. The terminal device according to claim 11, wherein the fingerprint receiving module comprises a fingerprint capacitor chip, and the fingerprint receiving module is configured to perform operations of:

sensing approaching of the finger of the user, wherein capacitance of at least partial region of the fingerprint capacitor chip varies, and variation of the capacitance serves as the triggering instruction;

receiving variation of the capacitance of various regions of the fingerprint capacitor chip based on the triggering instruction; and calculating the fingerprint pattern of the user based on the variation of the capacitance of various regions of the fingerprint capacitor chip.

13. The terminal device according to claim 11, wherein calculating the pulse information of the user based on the second light wave by the optical identification module comprises:

comparing an amount of each light wave in each frequency of the second set of light waves to an amount of that of the first set of light waves correspondingly, and calculating a fixed amount of light wave absorbed by a vein of the finger of the user.

14. The terminal device according to claim 11, further comprising a cover, wherein the cover is configured to cover the fingerprint receiving module and the pulse receiving module to insulate the fingerprint receiving module and the pulse receiving module from the finger, the cover is a transparent cover, and the pulse receiving module is arranged between the cover and the fingerprint receiving module.

15. The terminal device according to claim 11, wherein the biometric identification apparatus further comprises a processing module, and the processing module is coupled with the fingerprint receiving module and the pulse receiving module respectively;

the processing module is configured to compare the fingerprint pattern collected by the fingerprint receiving module to a predefined fingerprint pattern; determine the user to be a first authorized user in response to the fingerprint pattern of the user matching with the predefined fingerprint pattern; compare the pulse information collected by the pulse receiving module to predefined pulse information; compare a temperature of the finger collected by the pulse receiving module to a predefined temperature; determine the user to be a second authorized user in response to a comparison result of the pulse information and the temperature of the finger being within a predefined range; unlock the biometric identification apparatus in response to the user being determined to be both the first authorized user and the second authorized user.

16. The terminal device according to claim 11, wherein the biometric identification apparatus further comprises a processing module, and the processing module is coupled with the fingerprint receiving module and the pulse receiving module respectively;

the fingerprint receiving module is further configured to compare the collected fingerprint pattern of the user to a predefined fingerprint pattern, determine the user to be the first authorized user in response to the fingerprint pattern of the user matching with the predefined fingerprint pattern;

the pulse receiving module is further configured to compare the collected pulse information to predefined pulse information; compare a temperature of the finger to a predefined temperature, determine the user to be the second authorized user in response to a comparison result of the pulse information and the temperature of the finger being within a predefined range; and the processing module is configured to unlock the biometric identification apparatus in response to the user being determined to be both the first authorized user and the second authorized user.

17. The terminal device according to claim 11, wherein the biometric identification apparatus is configured to perform operations of:

sensing approaching of the finger of the user, generating the triggering instruction in response to the sensed approaching;

collecting the fingerprint pattern and the pulse information of the user in response to the triggering instruction;

identifying the fingerprint pattern and the pulse information of the user, determining whether the user being an authorized user; and unlocking the biometric identification apparatus in response to the user being determined to be both a first authorized user by using the fingerprint pattern and a second authorized user by using the pulse information.

18. The terminal device according to claim 17, wherein the sensing approaching of the finger of the user and generating the triggering instruction in response to the sensed approaching comprises generating the triggering instruction based on variation in capacitance generated by a finger touch;

the collecting the fingerprint pattern comprises:

receiving the variation in capacitance of various regions of a fingerprint capacitor chip based on the triggering instruction; and calculating the fingerprint pattern of the user based on the variation in capacitance of various regions of a fingerprint capacitor chip; and collecting the pulse information of the user by the biometric identification apparatus comprises:

emitting a first light wave to the finger based on the triggering instruction, wherein the first light wave comprises a first set of light waves in various frequencies; and receiving a second light wave, wherein the second light wave is generated by the finger reflecting the first light wave and comprises a second set of light waves in the various frequencies corresponding to the first set light waves; comparing an amount of each light wave in each frequency of the second set of light waves to an amount of that of the first set of light waves correspondingly; and calculating a fixed amount of light wave absorbed by a vein of the finger of the user; and the biometric identification apparatus is further configured to perform operations of:

receiving a third light wave, and calculating a temperature of the finger based on the third light wave, wherein the third light wave is spontaneously generated by the finger and comprises a third set of light waves, and a frequency of each light wave of the third set of light waves is different from the various frequencies of the first set of light waves.

19. The terminal device according to claim 17, wherein the identifying the fingerprint pattern and the pulse information of the user and determining whether the user being the authorized user comprises:

comparing the fingerprint pattern obtained by calculation to a predefined fingerprint pattern; determining the user to be the first authorized user in response to the fingerprint pattern of the user matching with the predefined fingerprint pattern; and comparing a fixed amount of light wave absorbed by a vein of the finger of the user to a predefined amount and comparing a temperature of the finger to a predefined temperature, determining the user to be the second authorized user in response to a comparison result of the amount of light wave absorbed by the vein and the temperature of the finger being within a predefined range.

\* \* \* \* \*